United States Patent Office 3,482,451
Patented Dec. 9, 1969

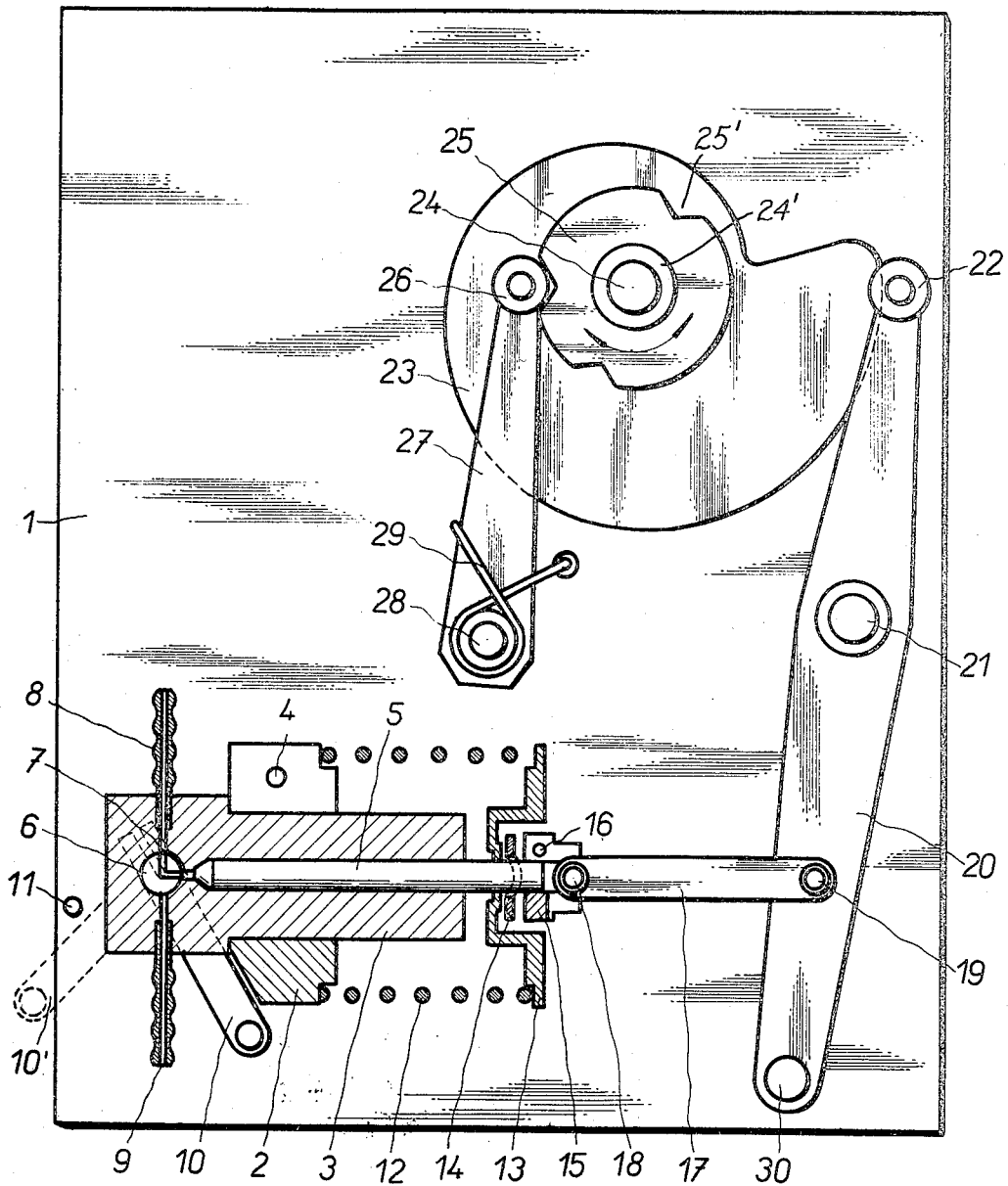

3,482,451
STROKE CONTROL FOR A PISTON SAMPLER USED IN CHROMATOGRAPHY
Jiří Hrdina, Prague, Czechoslovakia, assignor to Ceskoslovenska akademie ved, Prague, Czechoslovakia, a corporation of Czechoslovakia
Continuation of application Ser. No. 491,791, Sept. 30, 1965. This application Aug. 2, 1968, Ser. No. 754,122
Claims priority, application Czechoslovakia, Oct. 1, 1964, 5,447/64
Int. Cl. G01n 1/10
U.S. Cl. 73—423        4 Claims

ABSTRACT OF THE DISCLOSURE

Control means for a sample supply device in a chromatographic analyzer wherein a pivotable lever actuates a piston reciprocable in a pump cylinder which first sucks samples to be analyzed from a source of sample medium into at least one sample receiver and thereafter discharges the analyzed sample through a waste line. Said lever is limitatively pivoted by adjacent cam means which are positionally adjustable to control the limit of movement of the lever and piston.

CROSS REFERENCE TO RELATED APPLICATIONS

This application is a continuation of copending application Ser. No. 491,791, filed Sept. 30, 1965, now abandoned.

This invention relates to a device for supplying samples and protective solutions into sample receivers in chromatographic analyzers.

In modern fully automated processes in column chromatography, capillary sample receivers are used into which samples are sucked to be thereafter transferred to the column over respective closure means. In many cases it is important that a precise amount of the sample transported into the sample receiver should be measured before being further transported to the column. In devices which contain only one or two sample receivers their supply can be carried out for example by sucking from a reservoir up to a certain marking, the sample receiver functioning in this case as a volumetric pipette. If, before the sample is sucked in, the sample receiver contains a column of a buffer separating by its bubble pistons one sample from another, the condition for precise measuring requires that the sample be very precisely sucked in to a distinct marking the observation of which can be facilitated for example by a suitable optical magnification. Another condition is that no liquid that preceded the newly introduced sample should remain in those portions of the capillary sample receiver which receive the newly sucked in sample. This can be realized in hydrophobized sample receivers wherein the amount of liquid adhering to the walls is negligible. However, a durable and adequate hydrophobization is not easily accomplished, especially for acidic buffers and for samples dissolved in them in a manner adequate to its purpose. Sucking to the above mentioned markings in the manner used in pipettes is also practically uncomfortable and the applicability is limited to cases where a greater number of sample recipients is used as for example in a two-column process making for instance six twin-analyses in 24 hours, the samples for all the analyses being filled in advance into the sample receivers.

The invention relates to a device for supplying samples and protective solutions from a reservoir into sample receivers of chromatographic analyzers and obviates the disadvantages described above. According to this invention a central suction device is operated in a programmed predetermined manner and its operating is stopped at precise positions during selectable intervals; the connection of the suction device with individual sample receivers alternates with the connection to the reservoir.

The central suction device, to which are sequentially connected the individual sample recipients, consists of a cylinder in which moves a piston and a distributing turning slide valve, the motion of the piston being controlled by precisely defined separated lots by means of a cam which rests through the agency of a roller on a two-armed lever connected by means of a connecting rod and a sleeve to the piston.

The said cam, which is turnable around a pivot, is formed by spiral shaped and circular arches which are concentric with the axis of the said pivot to which is fixed another cam provided with recesses. Into these recesses engages through the agency of a roller a fixation lever mounted on its pivot and pressed into engagement by a spring.

An embodiment of my invention is illustrated in front view partly in section in the appended drawing.

To a supporting desk 1 is fixed by screw 4 a frame member 2 of a pump cylinder 3, which houses a reciprocable piston 5 and a rotary distributing valve 6. This distributing valve 6 is rotatable by arm 10 between limiting means over an angle of say 90° or smaller and in its extreme positions connects a channel 7 leading to the working space above the piston 5 either with an outlet branch 8 leading to a not shown capillary receiver for the sample to be analyzed or with a suction branch 9 coming from the not shown sample reservoir. The valve 6 is adjustably operated by said arm 10 which is turnable in anticlockwise direction against the force of a not illustrated spring into the position 10' defined for example by a stop plug 11. When arm 10 is in position 10' the distributing valve 6 connects by means of its angular channel the cylinder space to the suction branch 9. The piston 5 is permanently pulled outwardly of cylinder 3 by the pressure spring 12 which is placed between the stationary frame 2 and a disk 13 mounted with a certain clearance on the piston 5. The pressure of spring 12 upon disk 13 is transferred over ring 14 to a clamping sleeve 15 fixed to the outer end of piston 5 by means of screw 16. Said ring 14 functions as a simple Cardan joint being in contact with the disk 13 only in two diametrically opposed points. The sleeve 15 is articulated to a connecting rod 17 by means of a pivot 18. Another pivot 19 links the connecting rod 17 with one arm of the double-armed lever 20 swingable around a stationary pivot 21. With an angular amplitude of the lever 20 the pivot 19 circumscribes a substantially flat arc so that at a sufficiently long connecting rod 17 the side components of the pressures acting on the piston 5 are held at a minimum, to which also contributes the fact that the pressure spring 12 acts on the piston 5 centrically since the ring 14 operates like a Cardan joint. The suppression of the side components to a minimum is desirable especially when the piston 5 is guided only in a semi-solid material as for example Teflon, of which the working cylinder 3 can be made. The lever 20 carries at the end of its other arm a roller 22 or other sliding member which engages with and is actuated by a cam 23. This cam 23 is turnable around a pivot 24 together with an auxiliary disk 25 which has several peripheral recesses 25' into which can engage a roller 26 or other catch member mounted at the end of a control lever 27. This lever can swing round a pivot 28 and is pressed permanently into engagement with the disk 25 by a spring 29. The cam 23 and the disk 25 are firmly connected with each other and can be turned by a hand knob 24'. The turning of this hand knob 24' and thus also of the cam 23 acting on member 22 brings about the motion of the piston 5 in the cylinder 3 against the force of the pressure spring 12. The members 23, 25 are in certain positions fixed by the roller 26 which engages into the recesses 25' of the cam 25.

If the members 23, 25 are turned in the anticlockwise direction from the initial position shown in the drawing suction takes place through the conduit 9 into the space above the piston 5 while the same moves outwardly of cylinder 3. This suction motion is arrested when the roller 26 engages any of the recesses 25' on the circumference of the disk 25. As the members 23, 25 move between two neighboring recesses 25' a certain precisely reproducible amount of sample material is sucked into cylinder 3. Said precise apportioning can even be increased if the helical circumference of cam 23 is interrupted by a certain short circular arc with a center at the axis of rotation of cam 23 so that not even small angular deviations will change the precise position of the piston 5 in the working cylinder 3. When turning the cam means it is possible to easily ascertain by touch whether and when the roller 26 engages a respective recess 25'. In this way it is for example possible prior to the suction of a sample to be analysed into the capillary sample receiver to suck in first a certain amount of air to form separating pistonlike bubbles which will prevent mixing with following liquidal portions. After sucking in the first bubble piston, the mouth of the capillary sample receiver is submerged below the level of the sample medium and by further turning the cam system a precise and very faithfully reproducible volume is sucked into the capillary sample receiver, possibly after sucking off any drop pehraps sticking to the mouth of this sample receiver. After that the level can again be lowered so that another bubble piston is sucked in by further turning the cam system.

By continued turning of the disk 25 and with a sufficiently large dimensioning of the working space in the pump cylinder 3, it is then possible to suck into the sample receiver in an analogous way from a respective reservoir or other source a certain amount of a protective buffer, either in a column divided by one or more bubble pistons or in a single column. The column of the protective buffer can thus be divided into separated short sections which effectively contribute to a perfect transfer of the sample to the column; the entire sample is transferred after washing with several mutually separated doses of a protective buffer medium so that even minute traces adhering otherwise to the walls of the sample receiver are washed off and transferred to the chromatographic column as well.

After the sample or possibly the buffer have been sucked into the sample receiver the space in the pump cylinder 3 above piston 5 is emptied by the operator of the device by applying the force of left-hand fingers to bring closer to himself the end of the lever 10 determining the position of the slide valve 6; thereafter the liquid above piston 5 is driven out by the pressure of, for example the operator's thumb, applied to the knob 30 in the lower end of lever 20 the piston 5 being manually moved against the force of the press spring 12 regardless of the contact of the roller 22 to disk 23. After finishing this operation it is possible to turn the disk 23 again into the initial position as shown and after loosening the grip of the fingers of the left hand the roller 22 is again in contact with the initial point of the cam 23 and the piston 5 resumes its initial precise position.

In addtion to the above described method in which at one turn of the cam system both the smple and the protective buffer are sucked in possibly by the separating bubble piston, it is possible to carry out the process in such a way that one turn of the cam involves only the suction of for example, the sample, whereas the next one or more turns produces in a similar manner the suction of the protective buffer. By selecting a temporary arrest in the motion of the cam system 23, 25 as caused by the engagement of the roller 26 into the recess of the cam disk 25, it is possible either to suck in more separating bubble pistons or to omit the same which is simply realized by leaving the mouth of the capillary sample receiver below the level of the liquid sucked in even in the sections which in another cycle are used for instance for the suction of bubble pistons.

In sucking both samples and protective buffers into sample receivers it is possible, alternately to the above described process when the cam 23 turns only in anticlockwise direction, to proceed with the emptying of the space above the piston 5 after turning the valve 6 by turning the cam means in reverse direction. The cam means which will turn in both directions within one incomplete turn should be provided with a respective stop against overtravelling beyond the active part of its circumference. Such a stop may be realized in various ways and is not illustrated. In that case also the above described handling with left hand is omitted.

The entire handling can then be realized with one hand only. It is necessary to see to it that before the change of the direction of turning of the cam 25 the lever 10 controlling the position of the distributing slide valve should be correctly positioned. In such positions the lever 10 must stay during time of the motion of the cam and must not be moved for example by a resilient force into a given position as described above.

In some cases the distribution realized by the distributing slide valve 6 may be omitted. The suction branch 9 is then permanently connected to the upper portion of the space in the working cylinder above the piston 5. Such a simplification may be admissible and suitable when that amount of buffer (or some other liquid or possibly gas) which must be driven out of the working space in the working cylinder 3 above the piston 5 can be driven out in the same way as the subsequent suction of the sample or buffer. Such driving out through the suction branch 9 or tubing connected thereto to which some of the capillary sample receivers are gradually connected can be carried out either after disconnecting some of the above said connections or even perhaps by driving out the required amount of the buffer which before dosing fills also the capillary sample recipients connected to the suction branch 9. After such preparation for the actual suction into the sample receiver the operation may be performed in the above described way without the necessity of switching over the working space by a special distributing means such as slide valve 6 or perhaps in the form of a special valve means inserted into the tubing connecting the sample receiver with the suction branch 9. In the above described simplified method the buffer from the connecting tubing and possibly even from the working space of the working cylinder 3 gets into the sample receiver if the connecting tubing has a sufficiently small internal volume. If a buffer of constant quality is involved this need not matter even in the last mentioned example of the method when the buffer is driven out directly through the sample receiver which subsequently is to be filled. In sample receivers through some of which flow or some of which are filled with buffers of different qualities, it is more suitable to use a shifting for example by means of a distributing slide valve as described before. This assures that into the individual sample receiver no other buffer may enter other than that which is to be filled into the respective sample receiver. This also avoids the danger of a possible partial mixing of the sample with a buffer or some other liquid in the working space of the pump cylinder 3 and in the connecting tubing and it is practically unnecessary to take into account whether the content of the connecting tubing and of the working space above the piston 5 was perhaps for any reason contaminated in a way that might interfere with a precise analytical procedure. In the illustrated device when properly used, the liquid moves always only in tubing 9 in the direction from the sample source to the pump 3 and out from there through the tubing 8.

What is claimed is:

1. Control means for a device supplying samples in a chromatographic analyzer comprising
   a source for the samples;
   at least one sample suction branch taking samples from said source;
   a pump cylinder and a piston reciprocable therein for drawing samples from said source into said sample receiver;
   a pivoted lever for actuating the piston;
   cam means operatively mounted adjacent said lever to limitatively pivot the same;
   and controllable positioning means for the cam means to adjust the limit of movement of the lever and piston.

2. Control means for a device handing samples for a chromatographic analyzer as defined in claim 1 wherein the cam means is constituted by a cam wheel having a circumferential spiral surface and oscillatingly mounted adjacent said lever, and cam engaging means mounted on said lever to cooperate with the cam wheel and to limit the pivotal movement of the lever and the reciprocation of the piston.

3. Control means for a device handing samples for a chromatographic analyzer as defined in claim 1 comprising
   positioning means constituted by a circular disc rotatable with said spiral cam wheel, at least two spaced notches arranged on the circumferential spiral surface thereof, and a spring loaded second swing lever adapted to engage with its end the said notches.

4. Control means for a device handing samples for a chromatographic analyzer as defined in claim 1 wherein the operating circumferential spiral surface of the cam wheel includes spaced circular arc portions positionally in angular extension substantially conforming to said notches.

References Cited

UNITED STATES PATENTS

| | | | |
|---|---|---|---|
| 3,110,310 | 11/1963 | Cislak. | |
| 3,184,122 | 5/1965 | Nerenberg | 73—425.6 |
| 3,197,285 | 7/1965 | Rosen | 73—425.6 X |

S. CLEMENT SWISHER, Primary Examiner

U.S. Cl. X.R.

73—425.6